United States Patent [19]

Aharoni et al.

[11] Patent Number: 5,610,734
[45] Date of Patent: Mar. 11, 1997

[54] CHROMATIC FOCAL PENCIL BEAM-GENERATING APPARATUS

[75] Inventors: Abraham Aharoni, Palo Also; Joseph W. Goodman, Los Altos, both of Calif.; Yaakov Amitai, Rehovot, Israel

[73] Assignee: Board of Trustees Leland Stanford, Jr. University, Stanford, Calif.

[21] Appl. No.: 386,257

[22] Filed: Feb. 9, 1995

Related U.S. Application Data

[63] Continuation of Ser. No. 10,817, Jan. 29, 1993, abandoned, which is a continuation-in-part of Ser. No. 944,160, Sep. 11, 1992, Pat. No. 5,422,746.

[51] Int. Cl.$^6$ .............................. G02B 5/32; G02B 5/04; G11B 7/00
[52] U.S. Cl. .................. 359/16; 359/19; 359/15; 359/615; 369/44.23
[58] Field of Search .................. 359/15, 16, 18, 359/19, 565, 566, 571, 615; 351/161, 172; 369/44.23

[56] References Cited

U.S. PATENT DOCUMENTS

| | | | |
|---|---|---|---|
| 3,185,021 | 5/1965 | Thompson | 359/615 |
| 3,707,687 | 12/1972 | Hercher et al. | 372/20 |
| 4,779,943 | 10/1988 | Tatsuno et al. | 359/19 |
| 4,832,464 | 5/1989 | Kato et al. | 359/19 |
| 4,981,332 | 1/1991 | Smith | 359/16 |
| 5,363,220 | 11/1994 | Kuwayama et al. | 359/15 |

*Primary Examiner*—Paul M. Dzierzynski
*Assistant Examiner*—Audrey Chang
*Attorney, Agent, or Firm*—Claude A. S. Hamrick

[57] ABSTRACT

An optical system is disclosed which focuses a polychromatic source to an extended focal pencil. The implementation makes use of two holographic optical elements (HOEs) fabricated and aligned to form a deliberate longitudinal color dispersion, but to alleviate lateral chromatic effects. Consequently, the HOE doublet focuses different wavelengths of the source to different locations along the optical axis. The strong intensity of the focused wavelengths dominate at each location, so that the overall beam has a near-diffraction-limited $1/e^2$ spot size and suffers only relatively weak background illumination. An alternative optical system using bulk lenses and several possible applications for the device are also described.

7 Claims, 9 Drawing Sheets

CHROMATIC FOCAL PENCIL BEAM-GENERATING APPARATUS

This application is a continuation of application Ser. No. 08/010,817 filed on Jan. 29, 1993, now abandoned, which is a continuation-in-part of our application entitled "SINGLE AND MULTIPLE ELEMENT HOLOGRAPHIC DEVICES FOR HIGH EFFICIENCY BEAM CORRECTION", Ser. No. 07/944,160 filed Sep. 11, 1992, now U.S. Pat. No. 5,422,746, and is assigned to a common assignee.

BACKGROUND OF THE INVENTION

1. Field of the Invention

The present invention relates generally to optical apparatus for focusing a light source, and more particularly to such apparatus using optical elements including holographic optical elements to focus a polychromatic source to an extended focal pencil.

2. Brief Description of the Prior Art

In optical communications, data storage, sensing and imaging apparatus and the like, laser devices are used as a light source, and optical means are provided to focus the laser beam to a small spot. In these applications laser diodes are normally the preferred form of laser, but because they are subject to astigmatism and beam divergence, they typically require bulky and expensive correction optics. A need thus exists for inexpensive, easily reproducible and compact correction optics. There are also a variety of optical manufacturing applications (lithography, laser welding/cutting, surgery, etc.) in which extended focal depth is a fundamental requirement for uniformity of the operation. For example, in laser cutting, a diverging beam leads to an undesirable variation of the cutting thickness with depth. Furthermore, in many of the applications mentioned above, the apparatus is quite sensitive to position of the focusing optics relative to the surface or object upon which the beam is to be directed, and as a result an expensive servo-mechanism must be used to continuously adjust the focus to the position of the surface. A need thus exists for an optical means having an extended focal depth such that the apparatus is relatively insensitive to minor changes in position of the work surface illuminated.

SUMMARY OF THE PRESENT INVENTION

It is therefore a principal object of the present invention to provide an optical system capable of providing a focal pencil beam having an extended focal depth.

Another object of the present invention is to provide an optical system to correct for aberrations in the light source so as to obtain optimal focal pencil cross-sections. For example, in the case of diode laser sources, the characteristic astigmatism and ellipticity can be corrected.

Still another object of the present invention is to provide an optical system including holographic optical elements which are designed to interact with a polychromatic source to develop a focal pencil beam having an extended focal depth.

A further object of the present invention is to provide improved laser optical apparatus optimized for use in optical communications, data storage, sensing, imaging and manufacturing applications.

Briefly, a presently preferred embodiment of the present invention includes the use of a pair of holographic optical elements in combination with a polychromatic laser diode device to develop a focal pencil. Two holographic optical elements are fabricated and aligned to form a deliberate longitudinal color dispersion while simultaneously alleviating lateral chromatic effects and other optical aberrations. The holographic doublet focuses different wavelengths from the source to different locations along the optical axis with the strong intensity of the focused wavelengths dominating at each location along the axis, so that the overall beam has a near diffraction-limited $1/e^2$ spot size and suffers only relatively weak background illumination. Alternatively, equivalent optical elements could be utilized.

A principal advantage of the present invention is that it provides a long-needed solution to many of the problems encountered in the use of laser diode sources in projection and reflection mode applications.

Another advantage of the present invention is that it provides a relatively low cost alternative to the bulky and expensive focusing and corrective optics used in modern applications of laser diodes.

Still another advantage of the present invention is that it provides a novel polychromatic pencil apparatus that can be used to improve many types of optical communications, data storage, sensing, imaging and manufacturing devices.

These and other objects and advantages of the present invention will no doubt become apparent to those skilled in the art after having read the following detailed description of the preferred embodiment which is illustrated in the several figures of the drawing.

IN THE DRAWING

Figure 15:
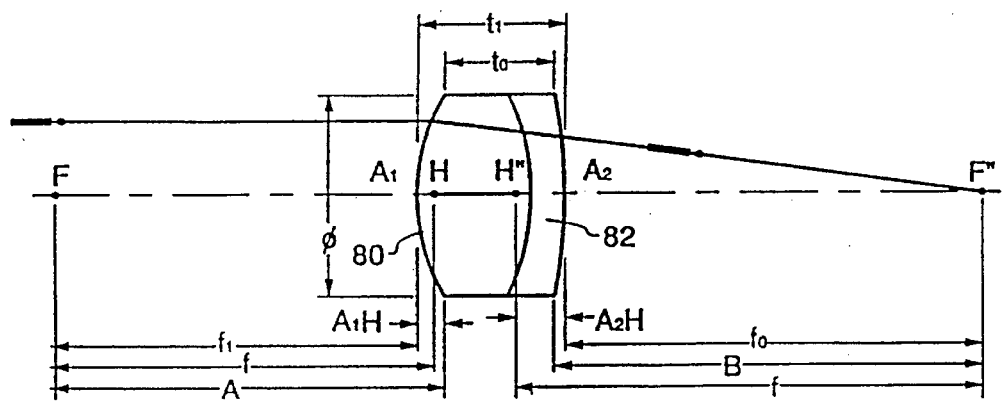
Figure 16:
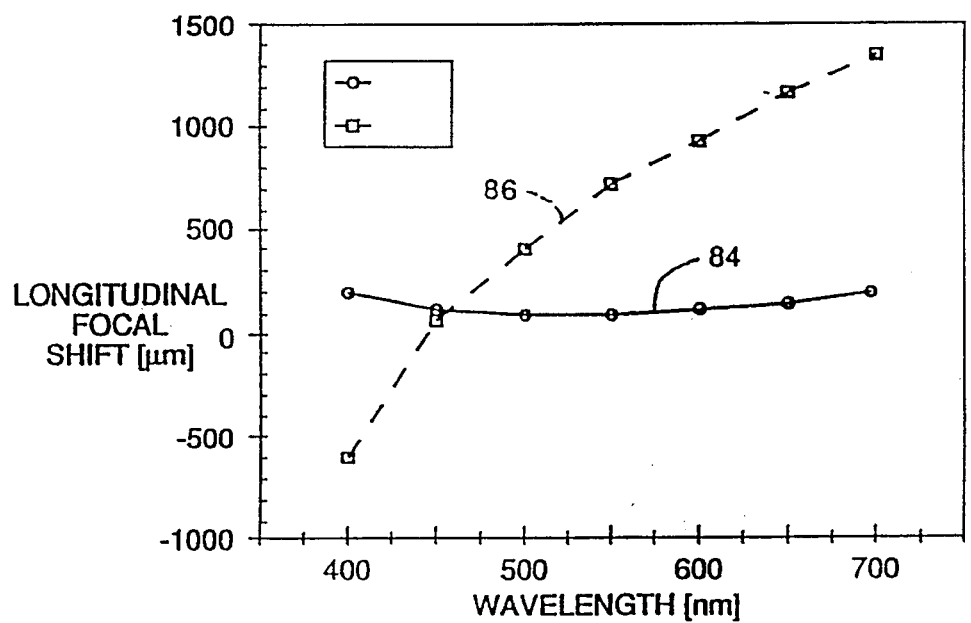

FIGS. 11 through 14 respectively illustrate generic configurations for chromatic focal pencil applications in projection mode, reflection mode, reflection feedback mode, and chromatic separated reflection mode;

FIG. 15 is a schematic presentation of a lens doublet as an alternative embodiment; and FIG. 16 is a diagram illustrating focal length as a function of wavelength for the standard commercial doublet and a similar doublet (dashed line) obtained by interchanging the materials of the first and second element.

DETAILED DESCRIPTION OF THE PREFERRED EMBODIMENTS

The underlying concept of the present invention is to obtain an extended focal depth by superposition of a plurality of beam components, each focused at a different location. While each beam component by itself diverges and therefore has a limited focal depth, the combination of the beams generates an overall effect of a distributed focus over an extended region. This approach is effective because the intensity of the combined beams is dominated at each point by the focused component at that particular point owing to its significantly higher intensity. To achieve this effect an optical system is required that is capable of generating a longitudinal distribution of focused beam components. Such a system is shown schematically in FIG. 1, where light from a source 10 is focused by an optical system 12 to different distances along an optical axis 14 to obtain the desired focal depth extension (the chromatic focal pencil 16). Whereas in the previous patent application this longitudinal dispersive system was designed for monochromatic sources, introduced here is a different concept which is based on chromatic longitudinal dispersion. For this purpose, the source 10 is necessarily polychromatic, and the system focuses different spectral components to different distances as required by the concepts of the present invention. It is clear that the focusing optical system 12 must be carefully designed to alleviate all optical aberrations except for the desired longitudinal chromatic dispersion in order to obtain optimal focusing. As described in the following, there are two general approaches to implement a suitable optical system. The classical approach employs refractive bulk optic elements with special provision for strong longitudinal color. A different and more preferred approach takes advantage of a holographic optical element (HOE) doublet that can readily be designed for a much stronger chromatic dispersion. The latter, preferred embodiment is described first.

Figure 2:
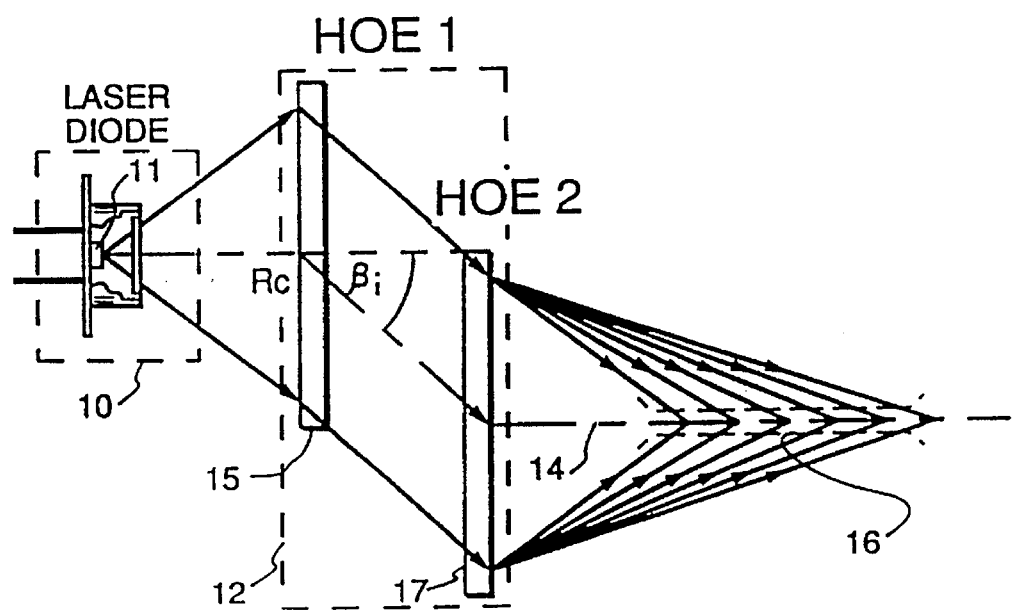
FIG. 2 is a schematic layout showing a laser diode and holographic focusing doublet providing lateral focal position compensation and extended chromatic focal dispersion in accordance with the present invention.

A suitable holographic doublet 15, 17 comprising the optical system 12 is shown in FIG. 2, where one element 15 serves to collimate a light beam from polychromatic laser-diode 11 of light source 10, and the other 17 serves to focus it. Here a laser diode source is shown, and it is understood that the first HOE 15 can correct for the aberrations characteristic to this element, such as astigmatism, as is taught in detail in Applicants' above-referenced application which is expressly incorporated herein by reference. As diffractive devices, each of the HOEs possesses very strong chromatic dispersion, as noted in the referenced application.

Figure 3:
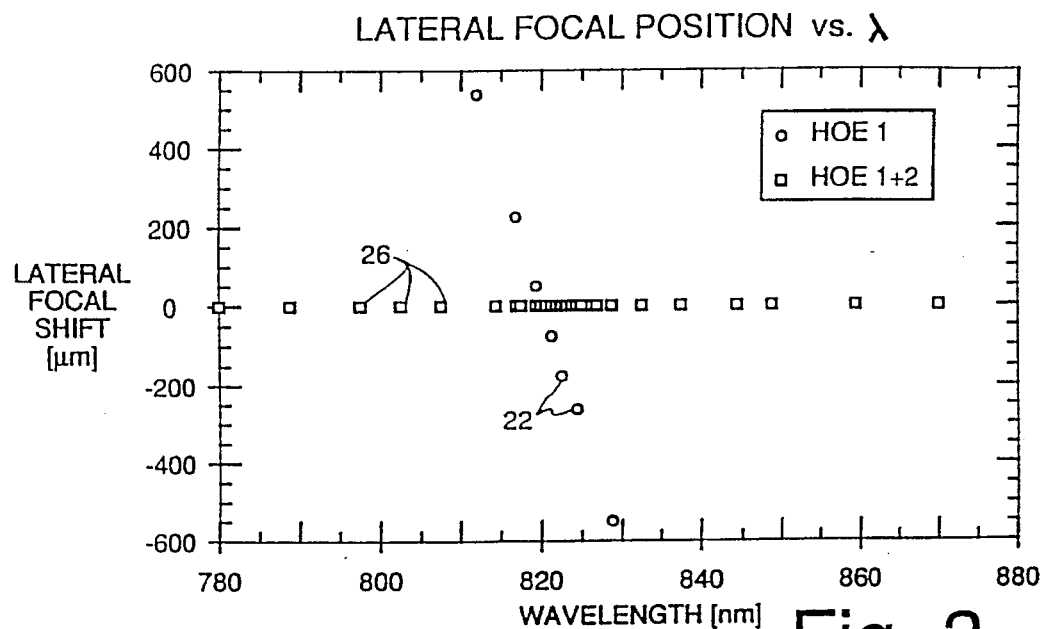
FIG. 3 is a chart showing lateral focal position as a function of wavelength for both single HOE and doublet HOE in accordance with the present invention.

For example in a typical HOE, for a one nm wavelength shift, the lateral focal position changes by 85 μm, as indicated by the circle points 22 in FIG. 3. In addition, when focused by a conventional optical device, the beam will experience longitudinal focal dispersion as indicated by the circle points 24 in FIG. 4. In the example given above, the longitudinal focal position changes by 100 μm. Although the focal spot size varies due to the divergence of the focused beam, the lateral shift remains uncorrected, and consequently no useful result is obtained.

Figure 4:
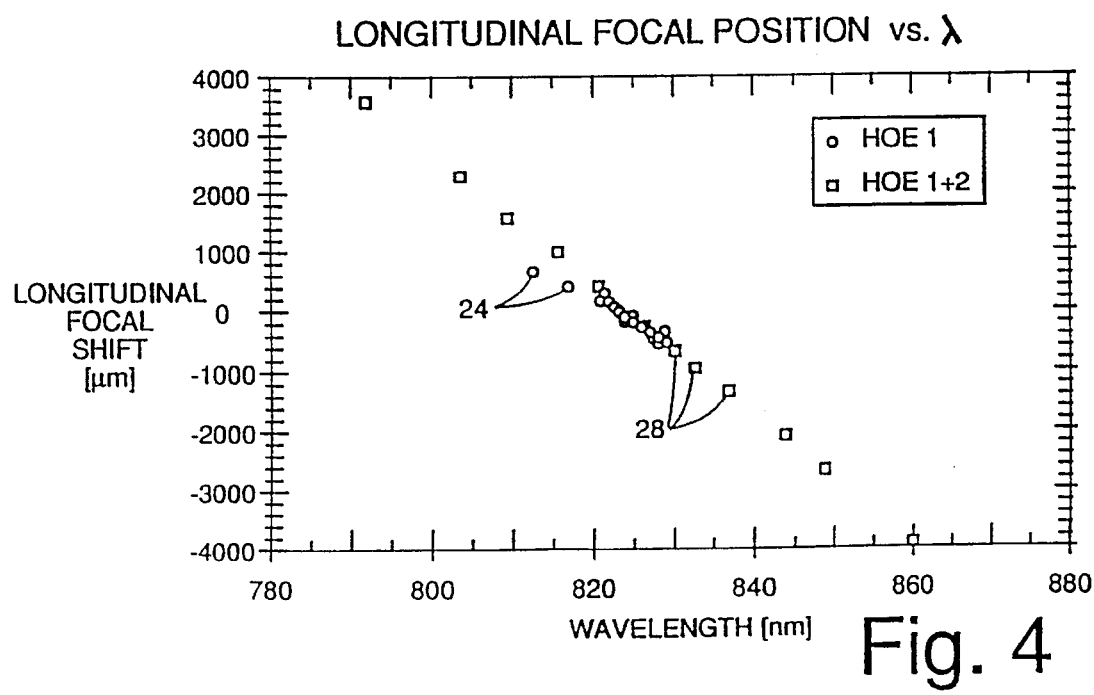
FIG. 4 is a chart showing longitudinal focal position as a function of wavelength for both single HOE and doublet HOE in accordance with the present invention.

However, by using two antisymmetric holographic elements 15 and 17, as indicated in FIG. 2, a near diffraction-limited spot size can be achieved with no variation in lateral position over a spectral range exceeding 100 nm, depicted by the square points 26 in FIG. 3, while at the same time maintaining strong longitudinal color dispersion, indicated by the square points 28 in FIG. 4. A chromatic focal pencil beam indicated by the dashed lines 16 in FIG. 2 is thus formed.

The HOEs used in the preferred embodiment further augment the chromatic focal pencil by incorporating in both holograms an axilens effect to reduce the divergence of the focal region for each wavelength of the source. This feature is fully described in the referenced application.

Figure 5:
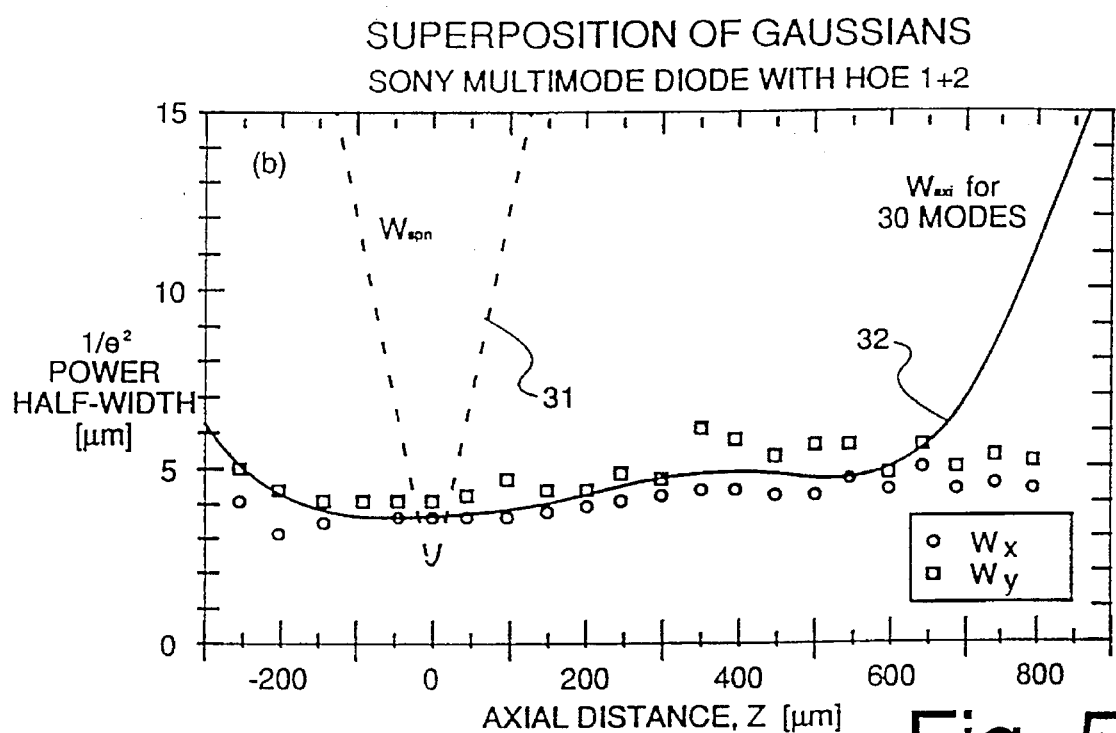
FIG. 5 is a chart illustrating chromatic focal pencil $1/e^2$ half-width in the vertical (circles) and the horizontal (squares) axes as a function of axial distance for the holographic doublet of FIG. 2, including experimental points for a multimode laser diode beam and a simulation curve for thirty axial diode modes.
Figure 6:
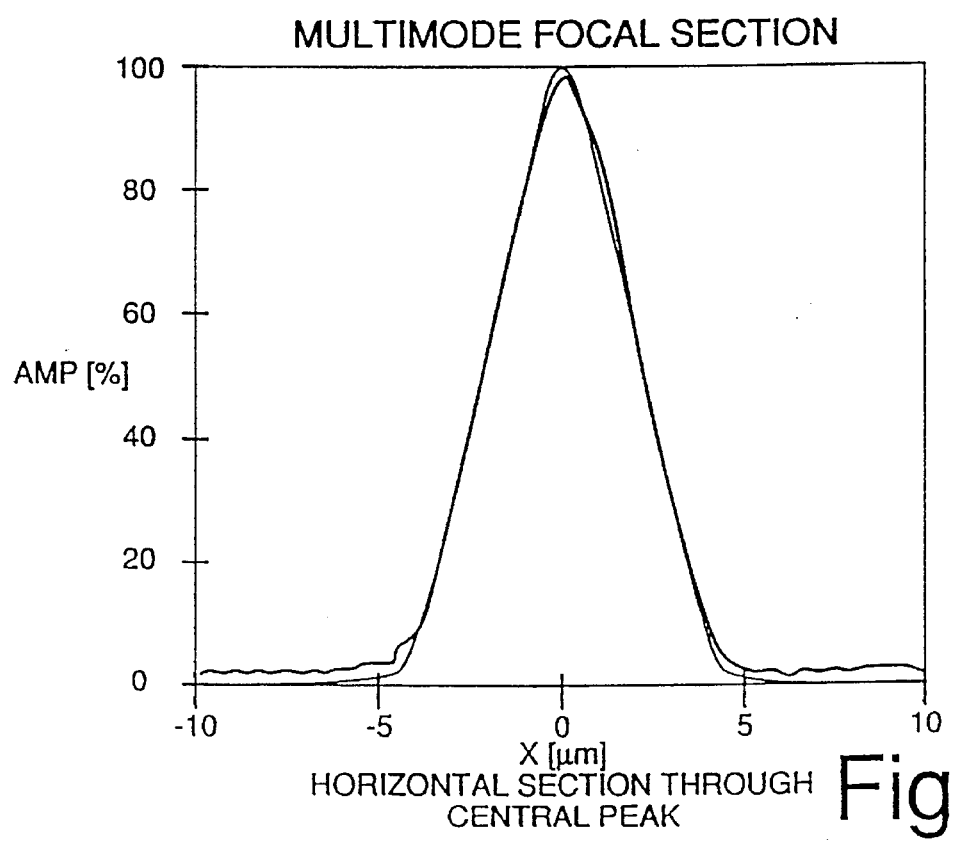
FIG. 6 depicts an experimental cross-sectional intensity profile compared to a Gaussian profile.

In the preferred embodiment, a multimode laser diode, such as the Sony SLD 202V, is used as the polychromatic source 10 to obtain the focal pencil performance shown in FIGS. 5 and 6. The HOEs 15 and 17 are fabricated and aligned to form a deliberate longitudinal color dispersion and to alleviate lateral chromatic effects. The doublet serves to focus different wavelengths from the laser source 10 to different locations along the optical axis. The strong intensity of the focused wavelengths dominate at each location, so that the overall beam has a near diffraction-limited $1/e^2$ spot size as suggested by the dashed lines 16, and suffers only relatively weak background illumination.

In accordance with the present invention, advantage is taken of the inherently strong chromatic dispersion of diffractive optical elements. In a typical HOE generated utilizing the methods described in our previously referenced application, for a one nm wavelength shift the lateral focal position by 85 μm, and the longitudinal focal position shifts changes by 100 μm. Consequently, the focal spot size varies due to the divergence of the focused beam. The $1/e^2$ focal spot size in this case is marginally larger (approximately 8 μm) than the theoretical diffraction limit (approximately 6 μm), as indicated by the dashed curve 31, but the effective focal depth is extended from approximately 60 μm for the diffraction-limited case to nearly 1 mm. Although over 30 longitudinal diode modes are active in this embodiment, the peak-to-background intensity ratio is better than 20:1, and the cross-section is essentially Gaussian, as shown in FIG. 6.

Figure 7A:
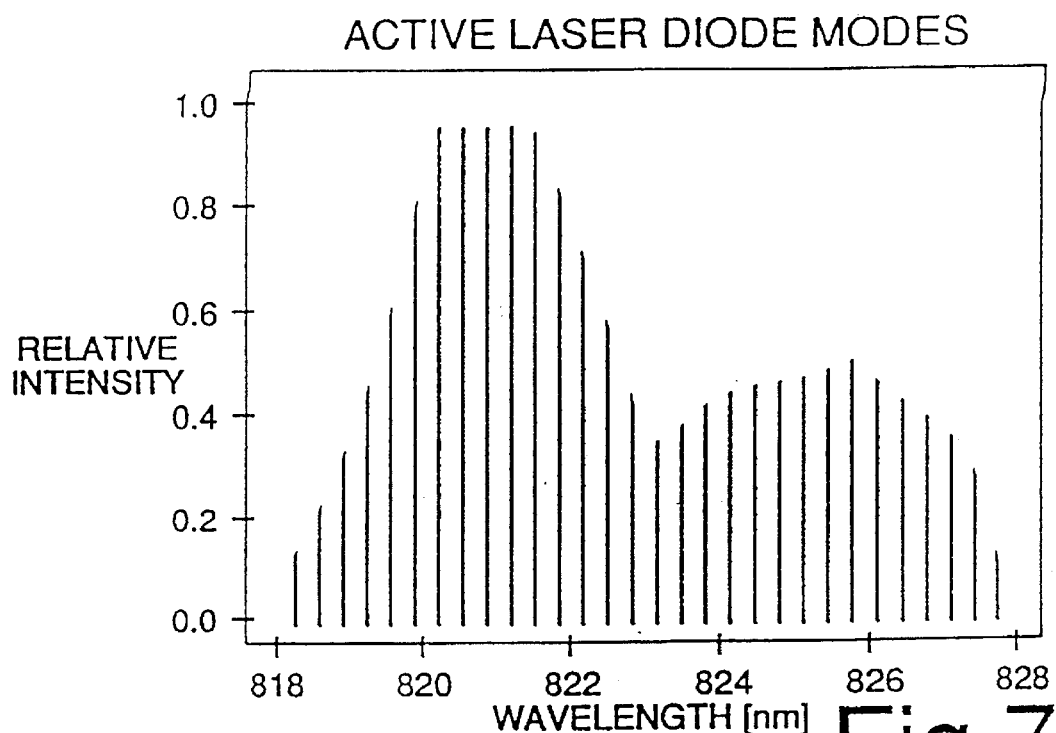
FIG. 7a is a diagram illustrating spectral mode distribution for the laser diode.
Figure 7B:
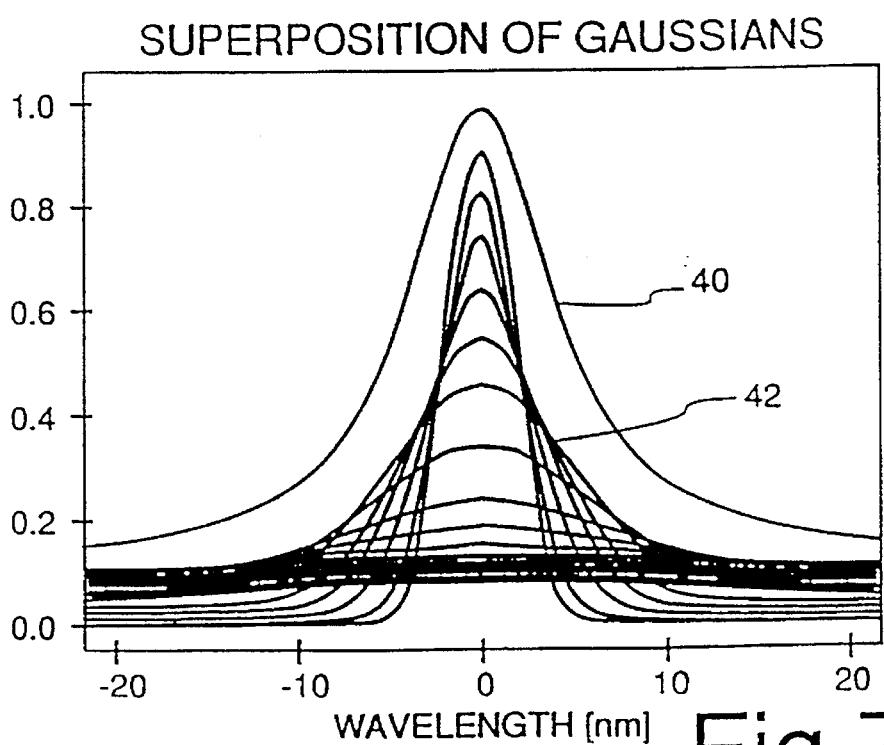
FIG. 7b depicts superposition of cross-sectional intensity profiles for thirty equal amplitude modes, each shifted in frequency and focal position.
Figure 8A:
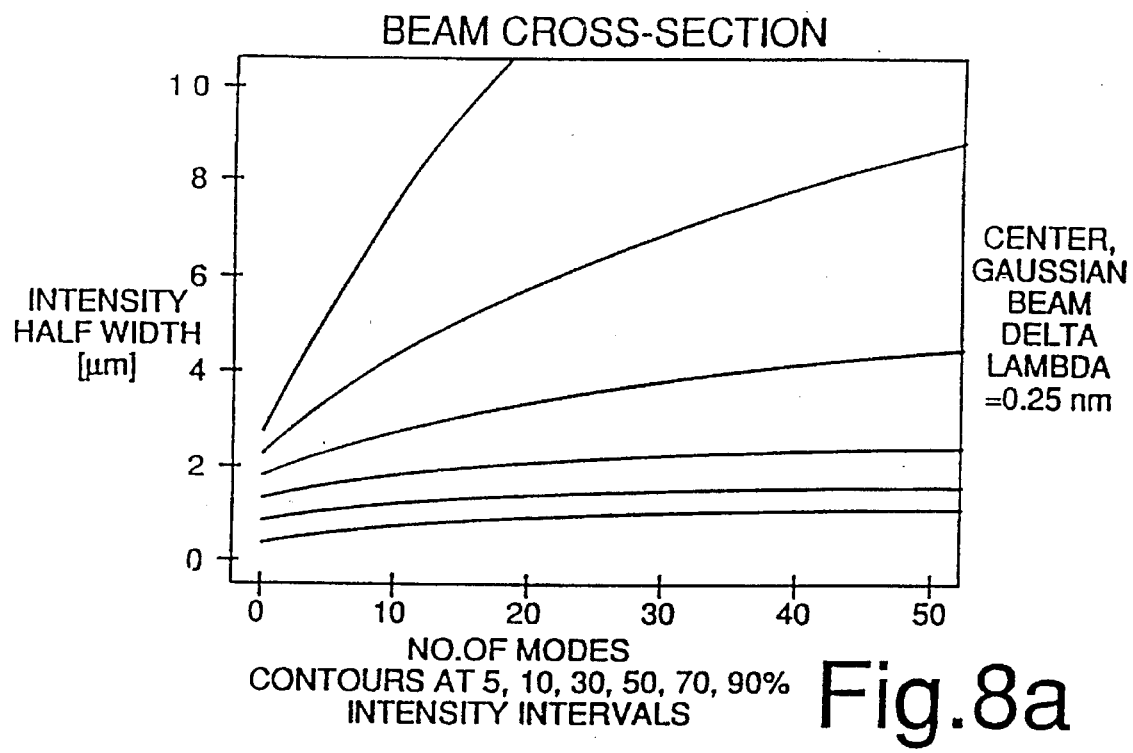
FIGS. 8a and 8b depict superposed cross-section widths at 90, 70, 50, 30, 10, and 5% of the peak as a function of the number of modes calculated at the center of the chromatic focal pencil for a spherical HOE doublet.
Figure 8B:
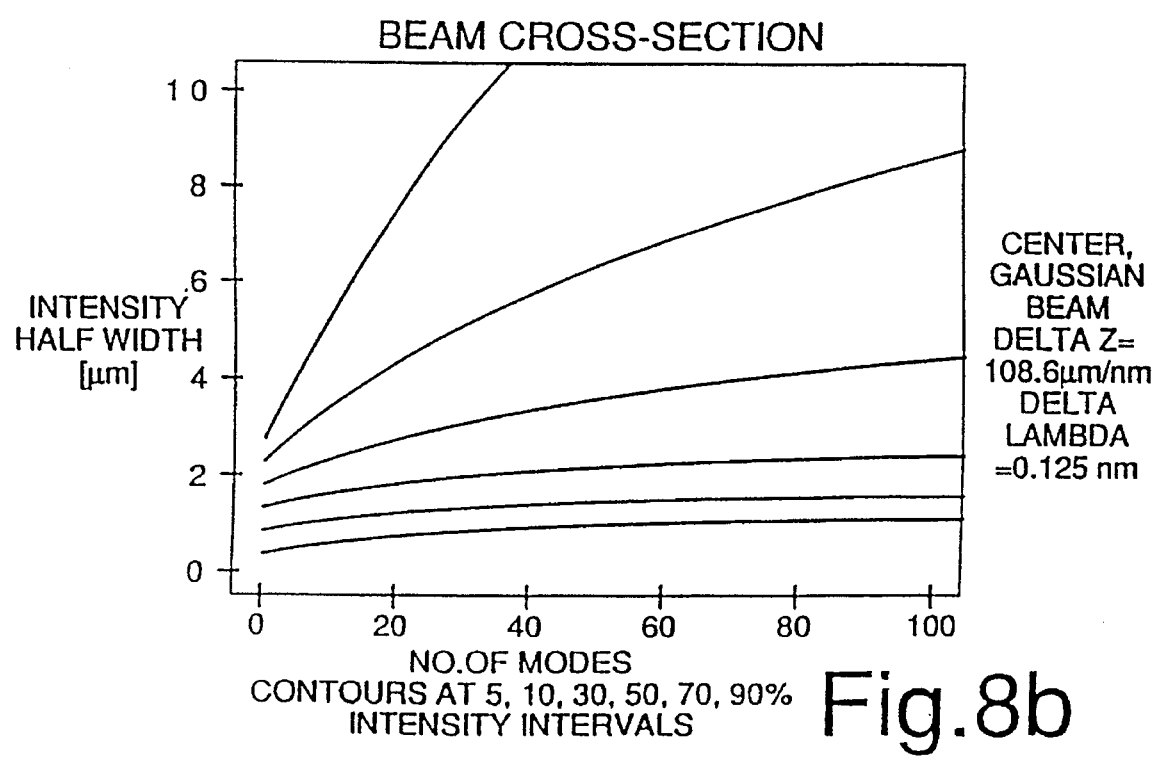
Figure 9A:
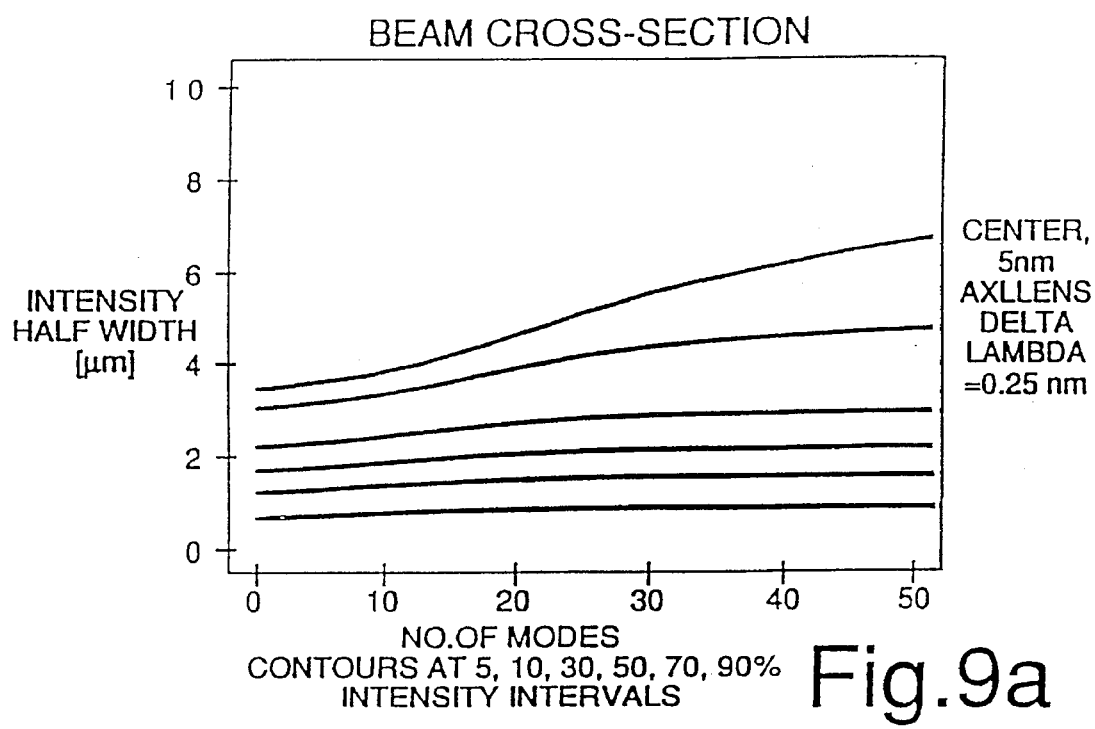
FIGS. 9a and 9b depict superposed cross-section widths at 90, 70, 50, 30, 10, and 5% of the peak as a function of the number of modes calculated at the center of the chromatic focal pencil for an axilens HOE doublet.
Figure 9B:
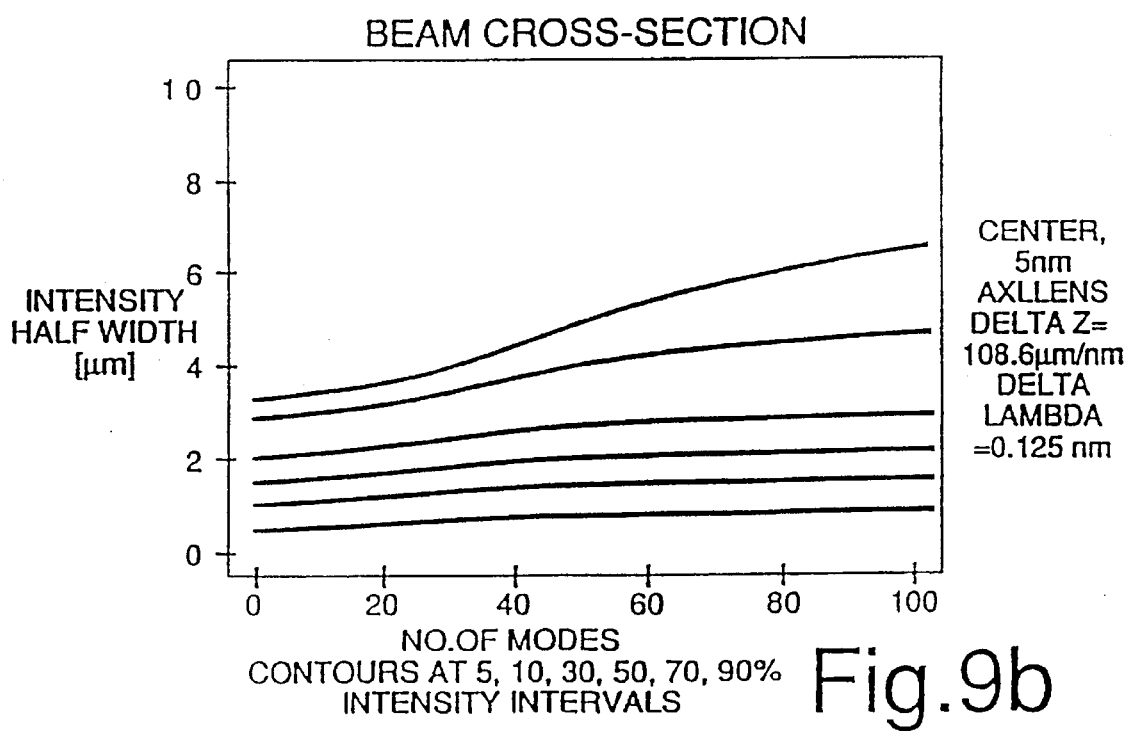
Figure 10:
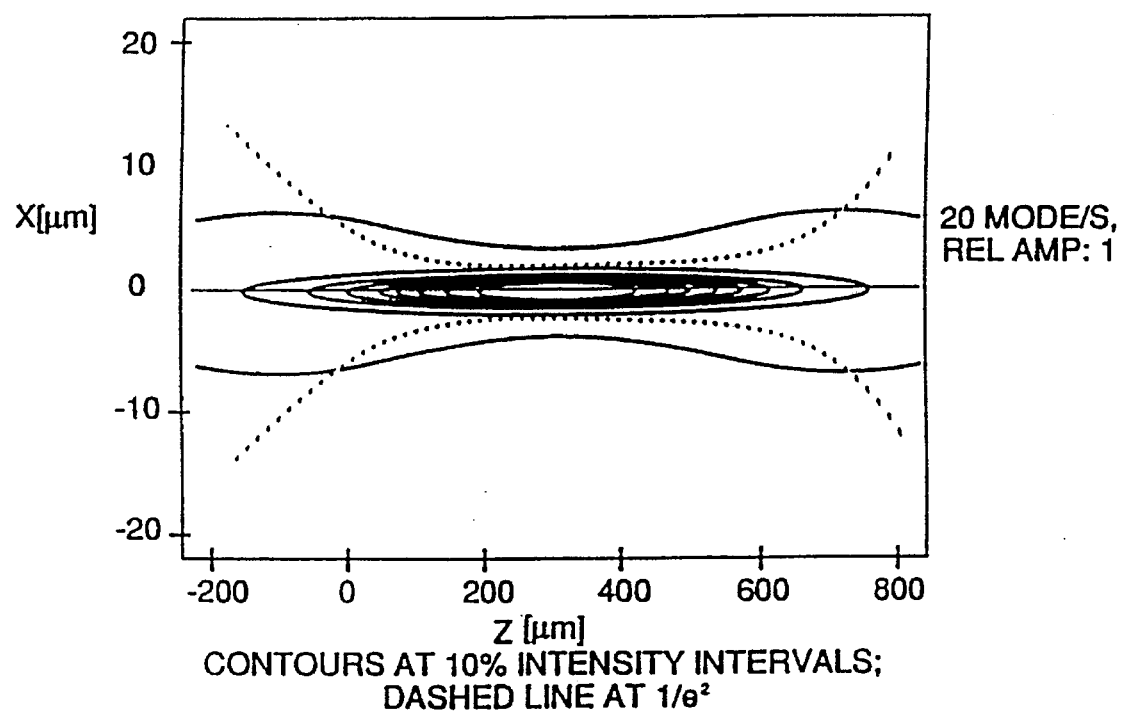
FIG. 10 is a cross-section of beam intensity for 20 laser-diode modes of equal amplitude as calculated by superposition of Fraunhofer diffraction patterns for the axilens HOE doublet.

These results are confirmed by incoherent superposition of thirty modes (solid theoretical line 32 in FIG. 5) spaced in accordance with the laser modes (0.32 nm) and having a relative intensity distribution as measured empirically and depicted in FIG. 7a. FIG. 7b shows the same superposition in cross-section. The effective profile 40 obtained by superposing the thirty mode profiles shown therebelow at 42 is broadened at its $1/e^2$ width only slightly with respect to the narrowest mode. As the intensity of the focused modes is significantly larger than that of the out-of-focus modes, the former dominate the peak of the combined profile while the latter mostly affect the "tails" of the resulting pattern. Interestingly, the cross-sectional distribution of the combined modes is nearly independent of the number of wavelengths present. The effective profile is determined by the overall spectral bandwidth of the source, the degree of longitudinal color of the HOE doublet, and the axilens values of the HOEs. These properties are borne out by FIGS. 8a, 8b, and 9a, 9b, which plot the width of the combined profile at different intensity percentiles for a spherical HOE doublet and an axilens doublet, respectively. FIG. 10 is a cross-section of beam intensity for twenty laser diode modes of equal amplitude as calculated by superposition of Fraunhofer diffraction patterns for the axilens HOE doublet. Using this model, it is possible to optimize the trade-off between signal-to-background and focal pencil length for a given application.

A suitable optical system with strong longitudinal color may be fabricated using a variety of methods. The following principal parameters are presented as a general guide for the construction of two HOE elements described in accordance with the referenced application.

1) Design wavelength: 820 nm;
2) Performance verified from 760 nm to 880 nm;
3) Effective focal length of the doublet: 20 mm;
4) Degree of longitudinal color: −200 μm per 1 nm wavelength shift;
5) Lateral color: immeasurable over tested wavelength range;
6) Design axilens value $\delta\lambda=5$ nm;
7) Chromatic variation in astigmatism: immeasurable over tested wavelength range;
8) Working aperture: 10 mm;
9) FWHM focal spot size (single mode, and multimode): 4 μm (>20% larger than diffraction limit); and
10) Diffraction efficiency: theoretical 94%; achieved >42%.

Returning now to the drawing, several applications of the present invention will be generally shown and described.

Projection Mode

Figure 11:
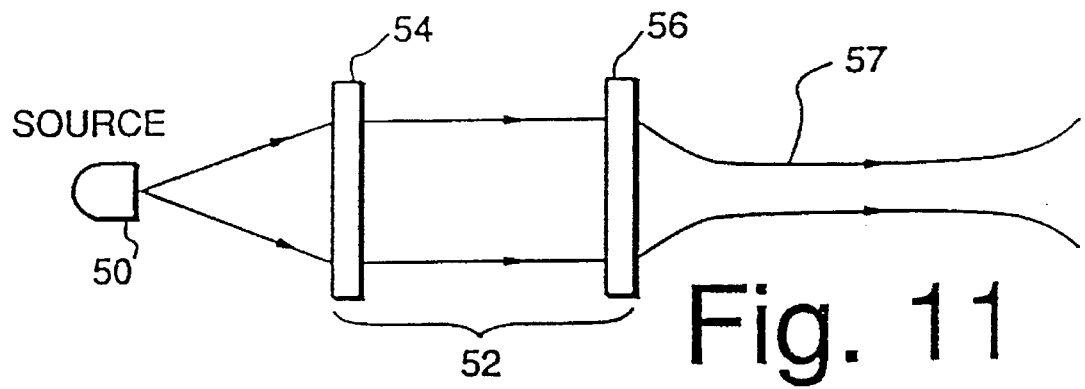

In FIG. 11, a simple combination of diode laser 50 and HOE doublet 52, including antisymmetric HOEs 54 and 56, can be used to provide a projection mode apparatus which might find application as follows:

a) As a particle illumination means in a particle velocity measurement apparatus. The extended focal pencil beam 57 allows for accurate location of particles in two dimensions. Additional chromatic focal pencil devices may also be used to locate particles in additional dimensions.

b) As an optical etching/machining apparatus. The extended focal pencil beam alleviates stringent limitations on the thickness of an etched/machined layer and can tolerate large variation in the work surface relief. The background illumination can be maintained below the effective threshold of the material.

c) As an optical printing apparatus. The extended focal pencil alleviates stringent limitations on variation in the working distance of the illuminating laser. The background illumination can be maintained below the effective threshold of the printing material.

d) As a CGH in volume holography apparatus. The extended focal pencil alleviates the stringent limitations on variation in the working distance of the illuminating laser. The background illumination can be maintained below the effective threshold of the recording material.

Reflective Mode

Figure 12:
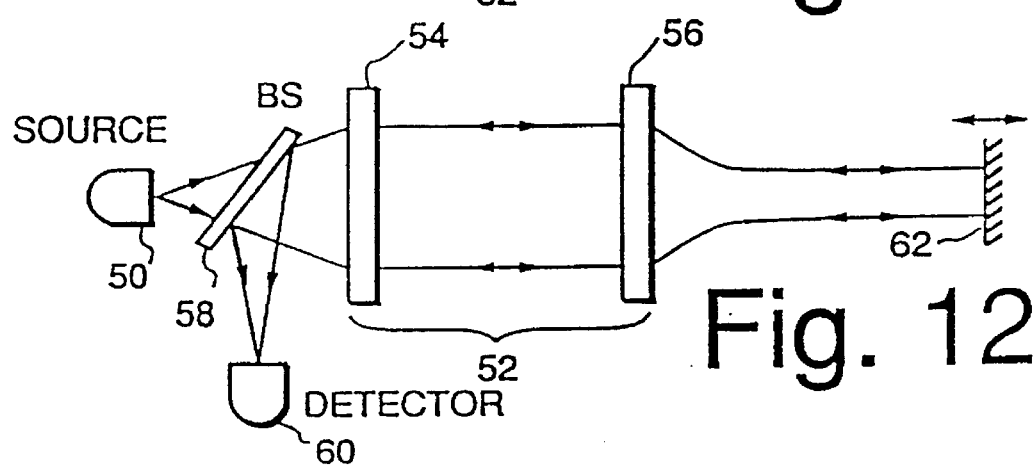

FIG. 12 illustrates an alternative use of the present invention in reflection mode apparatus and includes, in addition to the source 50 and doublet 52, a beam splitter 58 disposed between the source 50 and HOE 54, and a detector 60, all operating in conjunction with a reflective surface 62. Such apparatus might include the following:

a) Bar code reader devices. The extended focal pencil allows for a greater range of operational distances for many applications of bar code readers.

b) Optical disk readers. The extended focal pencil alleviates the need for servo-control of the reader head standoff.

c) Apparatus for scanning a relief object. The extended focal pencil alleviates the stringent flatness requirements for optical scanners and allows scanning of targets with appreciable relief.

Reflection Feedback Mode

Figure 13:
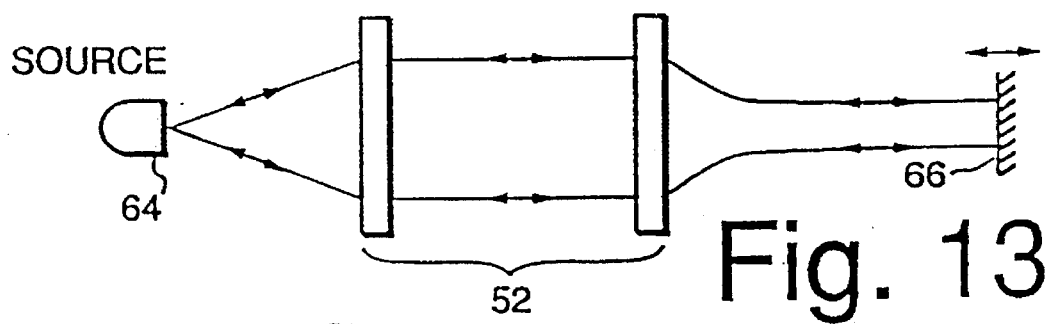

In FIG. 13, a laser source 64 is used in combination with an HOE doublet 52 and a movable reflective target 66 to provide apparatus operating in the reflection feedback mode useful in mode-selecting feedback devices. The chromatic focal pencil focuses a specific wavelength at a specific focal distance, thereby allowing the focal spot to reflect back into the laser source to favor the wavelength that is actually focused and to force the appropriate lasing mode, thereby forming a self-adapting focusing mechanism.

Chromatic Separated Reflection Mode

Figure 14:
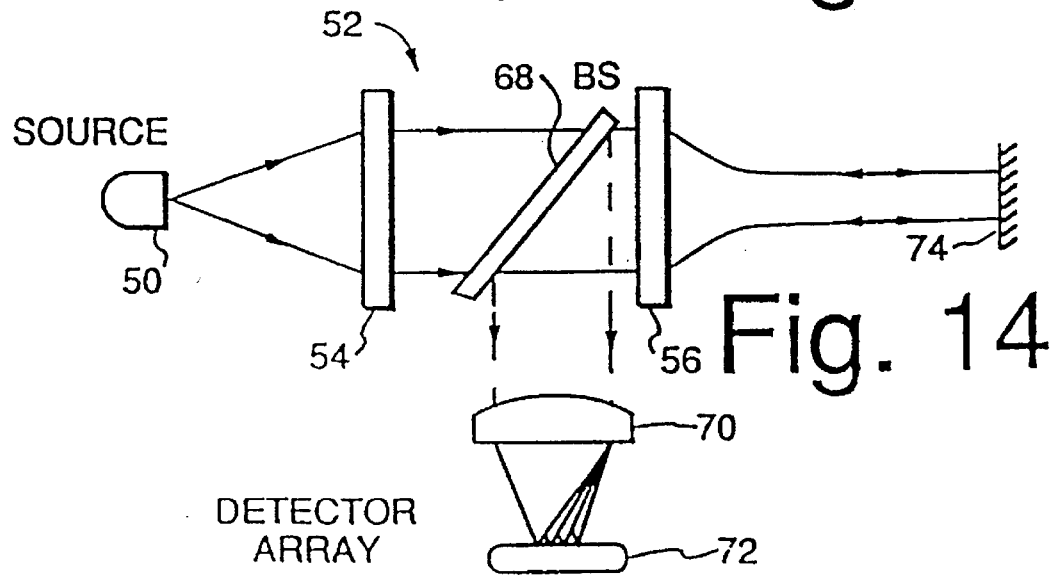

In FIG. 14, a laser source 50, HOE doublet 52, beam splitter 68 disposed between the HOE elements 54 and 56, a plano-convex lens 70, and a detector array 72 are used in conjunction with a movable reflector surface 74 to provide apparatus such as:

A) Height mapping/proximity sensor apparatus. In these applications, the lateral chromatic effects intermediate to the two HOE elements are used. Focusing the beam intermediate of the two HOEs separates the wavelengths of the source, and by virtue of the arrangement of the detectors in the array 72, the presence of these wavelengths may be translated to distance information for either mapping surface relief or monitoring the distance to a target.

B) WDM MUX/DEMUX apparatus. As in the height mapping/proximity sensor mentioned above, lateral chromatic effects intermediate to the two elements 54 and 56 can be utilized to multiplex or demultiplex wavelength division multiplexed (WDM) signals.

Figure 1:
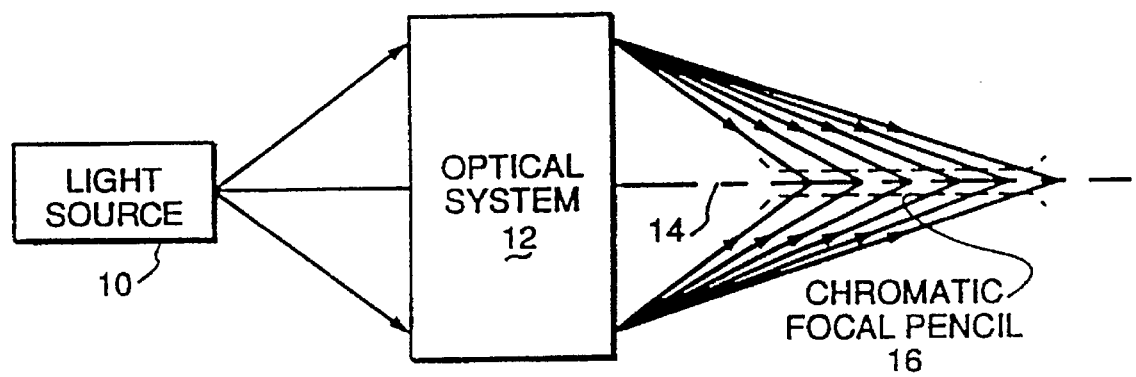
FIG. 1 is diagram schematically illustrating the concept of an optical apparatus for obtaining a chromatic focal pencil.

Alternatively, a functional equivalent to the above-described HOE implementation of the optical system shown generally in FIG. 1 can be achieved using bulk optics. For example, a standard commercial lens can be modified to obtain large longitudinal chromatic dispersion. Typically, lens design calls for minimal chromatic dispersion. This is often achieved by employing two lenses or a lens doublet including elements 80 and 82, as depicted in FIG. 15, wherein a suitable selection of lens material serves to reduce the overall dispersion. The dependence of the focal length on wavelength for a commercial doublet such as the Melles Griot 01 LAO 059 is presented in Table I of the Appendix and plotted in FIG. 16 as a solid curve 84. By interchanging the materials of the lenses 80 and 82, and adjusting their curvatures to retain the same nominal focal length, large longitudinal color dispersion can be obtained, as indicated in Table I and by the dashed curve 86 in FIG. 16. A ray-tracing program (Code V) was used for calculating both curves. The parameters of the optical surfaces for both systems are listed in Tables II and III. In Table IV, the refractive index dispersion of the lens material is used for the doublets of Tables II and III, as indicated.

It should be emphasized that the results described above are presented only for purposes of demonstrating the feasibility of chromatic focal pencil arrangements that are based on bulk optics. Clearly, such systems can be optimized with more detailed design.

From the above, it will be apparent that in accordance with the present invention a novel chromatic focal pencil apparatus has been provided which will find wide application in numerous physical implementations. Accordingly, although preferred embodiments and alternatives thereof have been disclosed above, it is anticipated that numerous alterations and modifications of the present invention will become apparent to those skilled in the art after having read the preceding disclosure. It is therefore intended that the following claims be interpreted as covering all such alterations and modifications as fall within the true spirit and scope of the invention.

APPENDIX

TABLE I

Dispersion of the focal length for the lenses of Tables II and III below.

| Wavelength | 700 | 650 | 600 | 550 | 500 | 450 | 400 |
|---|---|---|---|---|---|---|---|
| Lens I | 50.0774 | 50.0466 | 50.0201 | 50.0018 | 50.0006 | 50.0389 | 50.1794 |
| Lens II | 51.3360 | 51.1781 | 50.9845 | 50.7408 | 50.4245 | 49.9989 | 49.4007 |

TABLE II

Code V surface definitions for standard Melles Griot doublet with nominal focal length of 50 mm (01 LAO 059).

| Plane | Curvature | Thickness | Material | Aperture |
|---|---|---|---|---|
| Obj | 0.00000000 | ∞ | | |
| Stop | 0.03109453 | 4.4600 | Schott SK11 | 10.0 |
| 2 | −0.04450378 | 1.5000 | Schott SK5 | 10.0 |
| 3 | −0.01119069 | 0.0000 | | |
| Img | 0.00000000 | 0.0000 | | |

TABLE III

Code V surface definitions for a Melles Griot doublet for which the materials of the lenses have been interchanged and their curvatures modified to obtain a nominal focal length of 50 mm. The parameters marked with "v" are variables in the optimization.

| Plane | Curvature | Thickness | Material | Aperture |
|---|---|---|---|---|
| Obj | 0.00000000 | ∞ | | |
| Stop | −0.00082268 v | 4.4600 | Schott SK5 | 10.0 |
| 2 | −0.00269992 v | 1.5000 | Schott SK11 | 10.0 |
| 3 | −0.03522261 v | 0.0000 | | |
| Img | 0.00000000 | 50.0000 | | |

TABLE IV

Refractive index dispersion of the lens materials used for the doublets of Tables II and III above.

| Wavelength | 700 | 650 | 600 | 550 | 500 | 450 | 400 |
|---|---|---|---|---|---|---|---|
| SK5 | 1.663667 | 1.667085 | 1.671430 | 1.677120 | 1.684846 | 1.695847 | 1.712593 |
| SK11 | 1.559590 | 1.561236 | 1.563260 | 1.565821 | 1.569167 | 1.573710 | 1.580172 |

We claim:

1. A polychromatic focal pencil beam-generating apparatus comprising:

a polychromatic light source for generating a beam of light having a polychromatic spectrum; and optical means including a first holographic optical element for collecting and collimating said beam of light, and a second holographic optical element antisymmetric to said first holographic optical element for focusing the collimated beam and for correcting lateral chromatic shift caused by said first holographic optical element, the resulting beam having substantial longitudinal chromatic dispersion and forming a pencil beam of light having a wavelength at one end of said polychromatic spectrum focused at a first point that is remote from a second point at which light having a wavelength at the opposite end of said polychromatic spectrum is focused.

2. A polychromatic focal pencil beam-generating apparatus as recited in claim 1 wherein said light source is a diode laser.

3. A polychromatic focal pencil beam-generating apparatus as recited in claim 1 and further comprising:

beam-splitting means disposed along the optical axis between said source and said optical means; and light detector means for developing an electrical signal proportional to light directed thereupon, said beam-splitting means being operative to direct light reflected from a target and returned through said optical means onto said detector means, said apparatus being relatively insensitive to changes in separation between said apparatus and said target.

4. A polychromatic focal pencil beam-generating apparatus as recited in claim 3 wherein said light source is a diode laser.

5. A polychromatic focal pencil beam-generating apparatus as recited in claim 1 and further comprising:

a beam-splitting means disposed between said first and second holographic optical elements;

a detector array including a plurality of detector elements; and focusing means for focusing light reflected from an object and passed back through said second holographic optical element where it is directed by said beam-splitting means through said focusing means onto said array such that the position of said object determines the detector element upon which said light is focused.

6. A polychromatic focal pencil beam-generating apparatus as recited in claim 5 wherein said light source is a diode laser.

7. A polychromatic focal pencil beam-generating apparatus, comprising:

a polychromatic light source for generating a beam of light having a polychromatic spectrum, said light source including a mode-selectable diode laser;

optical means including a first holographic optical element for collecting and collimating said beam of light, and a second holographic optical element antisymmetric to and aligned relative to said first holographic optical element for correcting lateral chromatic shift caused by said first holographic optical element, the focused beam having substantial longitudinal chromatic dispersion whereby light having a wavelength at one end of said polychromatic spectrum is focused at a first point that is remote from a second point at which light having a wavelength at the opposite end of the polychromatic is focused; and a movable reflective target positioned along the optical axis of said optical means to reflect the focused beam back through said optical means to said laser to force the laser to lase in a mode determined by the wavelength focused at the position of said reflector.

* * * * *